June 7, 1938. F. C. GRISWOLD 2,120,069
FISHLINE REEL
Filed Jan. 21, 1937 2 Sheets-Sheet 2
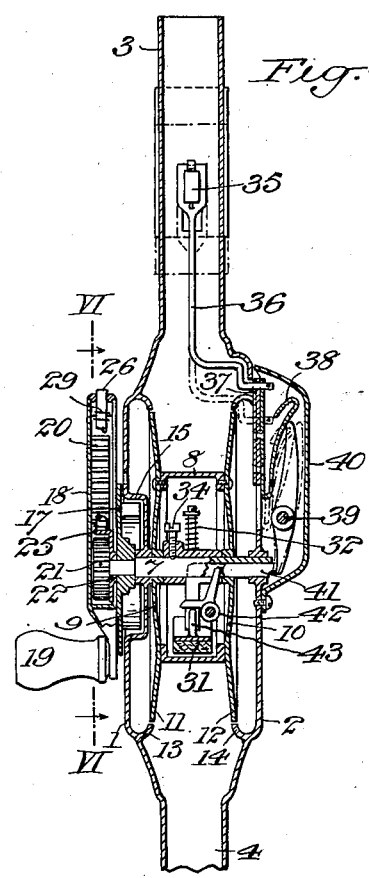
INVENTOR
Frederick C. Griswold
BY
ATTORNEYS Patented June 7, 1938

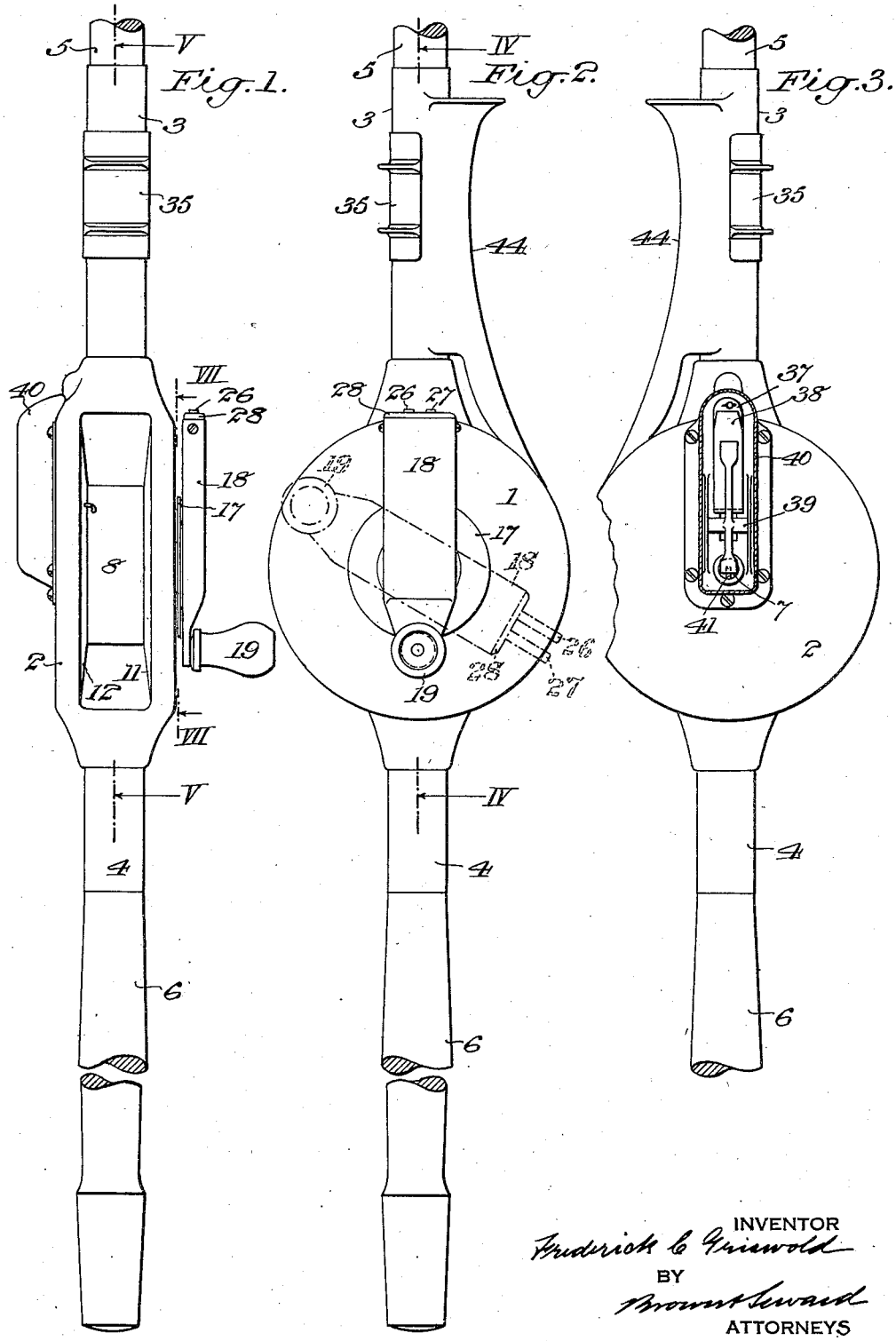

2,120,069

UNITED STATES PATENT OFFICE 2,120,069

FISHLINE REEL

Frederick C. Griswold, Port Jefferson, N. Y.

Application January 21, 1937, Serial No. 121,511

23 Claims. (Cl. 242—84.5)

The object of my invention is to produce a novel fish line reel which will be simple, strong and rigid and in which only two controls for the reel are necessary, one being a manually operated friction clutch for controlling the reel spool and the other a hand crank which, when operated in winding, automatically increases its leverage on the spool shaft as the pull on the line increases.

A practical embodiment of my invention is represented in the accompanying drawings, in which Fig. 1 represents a top plan view of the reel and its adjoining fore and butt portions of the fishing rod;

Fig. 2 represents a detail view of one side of the same, the hand crank being shown in full lines at the limit of its inward movement and in dotted lines at the limit of its outward movement;

Fig. 3 represents a detail view of the opposite side of the reel and its adjacent rod portions, the housing for some of the spool friction clutch operating parts being shown in section;

Fig. 4 represents a longitudinal central section taken in the plane of the line IV—IV of Fig. 2, looking in the direction of the arrows;

Fig. 5 represents a longitudinal central section taken in the plane of the line V—V of Fig. 1, looking in the direction of the arrows;

Fig. 6 represents a detail section, partly broken away, taken in the plane of the line VI—VI of Fig. 4, looking in the direction of the arrows;

Fig. 7 represents a detail section taken in the plane of the line VII—VII of Fig. 1, looking in the direction of the arrows; and Fig. 8 represents a detail cross section taken in the plane of the line VIII—VIII of Fig. 6, looking in the direction of the arrows.

The reel casing comprises, generally, the side plates 1, 2 and the front and rear radially alined tubular extensions 3 and 4, which extensions are fitted to receive the fore and butt portions 5 and 6 of the fishing rod.

A cross shaft 7 is rotatably mounted in the side plates 1 and 2 of the reel casing. The reel spool which is located within the casing between the side plates 1 and 2 is rotatably mounted on the cross shaft 7 and it is frictionally connected to the cross shaft when the manually operated friction clutch, to be hereinafter described, is applied. This spool, in the present instance, comprises the following elements: A cylindrical sleeve 8 of large diameter connects end plates 9 and 10 which are developed into flanges 11 and 12 extending beyond the cylindrical sleeve 8 for retaining the line wound on the spool.

The side plates 1 and 2 of the casing are provided with inwardly directed annular flanges 13 and 14 which overlap and serve as guards for the peripheral edges of the spool end plate flanges 11 and 12 to prevent the fish line from riding over the spool flanges.

The side plate 1 of the casing has a central recess 15 within which there is located a one-way clutch for locking the cross shaft 7 to the casing against reverse rotation. This one-way clutch is herein represented as a roller clutch, the rollers 16 working between the side walls of the central recess 15 and the cam walls of the inner face of a disc 17 which is fixed to the cross shaft 7 on which the spool is rotatably mounted, as for instance by shrinking the disc on said cross shaft.

A hand crank for controlling the operation of the spool is herein shown as comprising a housing 18 and its handle 19, said housing having a rack 20 which meshes with a pinion 21 fast on the cross shaft 7, which pinion is located within the said housing 18. A plate 22 is rotatably mounted on the cross shaft 7 between the disc 17 and the pinion 21, which plate is located within the housing and serves to guide the hand crank in its outward and inward movements across the axis of the cross shaft 7. To insure this movement the housing of the hand crank is provided with inwardly turned flanges 23, 24 sliding between the disc 17 and the plate 22.

The means which I have shown for yieldingly holding the hand crank at the limit of its inward movement with the handle 19 retracted is as follows: the plate 22 is provided with a lip 25 from which projects the pins 26, 27 slidable in the end plate 28 of the housing 18. Coil springs 29, 30 are interposed between the end plate 28 of the housing and the lip 25 of the plate 22.

It will thus be seen that as the hand crank is turned in one direction it will be moved outwardly against the tension of the spring means as the pull on the line and consequently on the crank shaft increases, said spring means serving to move the hand crank inwardly as the pull thereon decreases.

The manually operated friction clutch for connecting the spool to the cross shaft 7 with more or less friction, as desired, is herein shown as an expanding clutch carried by the cross shaft, which clutch is located within the cylindrical sleeve 8 of the spool, said friction clutch comprising a shoe 31 yieldingly held away from its frictional contact with the inner face of the spool sleeve 8 by spring means 32 carried by a sleeve 33 fixed to the cross shaft 7, as for instance, by the set screw 34.

The manually operated friction clutch control means is herein shown as comprising a finger slide 35 on the top of the front tubular extension 3 of the reel casing in position to be readily operated by the thumb of the user, which slide may be operatively connected to the friction clutch by the following elements: A rod 36 within the said tubular front extension 3 connects the finger slide 35 with a bar 37 slidable on the side plate 2 of the reel casing, which bar is provided with a yielding cam extension 38 engaging the outer arm of a rock lever 39 pivoted in the side walls of a housing 40 secured to the outer face of the side plate 2. The inner arm of this rock lever 39 engages the outer end of a pin 41 slidable lengthwise of the cross shaft 7, the other end of which pin engages one arm of a bell crank lever 42 pivoted on the sleeve 33 fixed to the cross shaft 7. The other arm of this bell crank lever 42 engages a projection 43 on the clutch shoe 31.

To facilitate the handling of the reel when combined with its rod I have provided the reel casing with a hollow hand grip 44 extending along the bottom of the front extension 3 from the side plates 1 and 2, which hand grip serves also as a brace for the said front extension 3. The channel through the hollow hand grip serves as a passage for the fish line on its way to and from the spool.

With reference to the winding control it will be seen that when there is no load on the line the line may be wound in rapidly because of the large diameter of the spool sleeve on which the line is wound and also because of the short throw of the handle of the normally retracted hand crank. It will also be noted that as the load on the line increases the throw of the handle of the hand crank is automatically increased because of its geared connection with the cross shaft 7. It will furthermore be seen that the one-way clutch will automatically lock the cross shaft to the casing to prevent the reverse rotation of the cross shaft, which clutch is mounted within the central recess 15 in the side plate 1 of the reel casing.

With reference to the manually operated means for controlling the friction clutch to frictionally connect the spool to the cross shaft, it will be seen that when the finger slide 35 is fully advanced, i. e., moved away from the spool, the spool may unwind freely. As the slide 35 is retracted the frictional effect on the spool is increased up to the full capacity of the friction clutch.

It will also be noted that a yielding element is provided between the finger slide 35 and the friction clutch, i. e., the cam extension 38 of the bar 37, thereby preventing a harsh or undue binding effect of the clutch shoe when expanded into frictional contact with the inner wall of the cylindrical sleeve 8 of the spool by the retraction of the finger slide 35.

The parts of the reel shown and described, but not claimed herein, form the subject matter of my copending application filed May 7, 1936, Serial No. 78,305.

It is evident that various changes may be resorted to in the construction, form and arrangement of the several parts without departing from the spirit and scope of my invention, and hence I do not intend to be limited to the particular embodiment herein shown and described, but

What I claim is:

1. In a fish line reel, a spool shaft, a pinion fast thereon, a hand crank having a rack meshing with the pinion, spring means for controlling the outward and inward movement of the hand crank as the pull thereon increases and decreases, and means rotatably mounted on the spool shaft for guiding the hand crank in its outward and inward movements.

2. In a fish line reel, a rotatable cross shaft, a spool rotatable on the cross shaft, a manually operated friction clutch carried by the cross shaft for frictionally engaging the spool, a pinion fast on the cross shaft, a hand crank having a rack meshing with the pinion, and spring means for controlling the outward and inward movement of the hand crank as the pull thereon increases and decreases.

3. In a fish line reel, a rotatable cross shaft, means for automatically locking it against reverse rotation, a spool rotatable on the cross shaft, a manually operated friction clutch carried by the cross shaft for frictionally engaging the spool, a pinion fast on the cross shaft, a hand crank having a rack meshing with the pinion, and spring means for controlling the outward and inward movement of the hand crank as the pull thereon increases and decreases.

4. In a fish line reel, a rotatable cross shaft, a spool rotatable on the cross shaft, a manually operated friction clutch carried by the cross shaft for frictionally engaging the spool, a pinion fast on the cross shaft, a hand crank having a rack meshing with the pinion, spring means for controlling the outward and inward movement of the hand crank as the pull thereon increases and decreases, and means for guiding the hand crank in its outward and inward movements.

5. In a fish line reel, a rotatable cross shaft, means for automatically locking it against reverse rotation, a spool rotatable on the cross shaft, a manually operated friction clutch carried by the cross shaft for frictionally engaging the spool, a pinion fast on the cross shaft, a hand crank having a rack meshing with the pinion, spring means for controlling the outward and inward movement of the hand crank as the pull thereon increases and decreases, and means for guiding the hand crank in its outward and inward movements.

6. In a fish line reel, a rotatable cross shaft, a spool rotatable on the cross shaft, a manually operated friction clutch carried by the cross shaft for frictionally engaging the spool, a pinion fast on the cross shaft, a hand crank having a rack meshing with the pinion, spring means for controlling the outward and inward movement of the hand crank as the pull thereon increases and decreases, and means rotatably mounted on the spool shaft for guiding the hand crank in its outward and inward movements.

7. In a fish line reel, a rotatable cross shaft, means for automatically locking it against reverse rotation, a spool rotatable on the cross shaft, a manually operated friction clutch carried by the cross shaft for frictionally engaging the spool, a pinion fast on the cross shaft, a hand crank having a rack meshing with the pinion, spring means for controlling the outward and inward movement of the hand crank as the pull thereon increases and decreases, and means rotatably mounted on the spool shaft for guiding the hand crank in its outward and inward movements.

8. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, and spring means for moving the hand crank inwardly as the pull decreases.

9. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, and spring means for moving the hand crank inwardly as the pull decreases.

10. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, spring means for moving the hand crank inwardly as the pull decreases, and means for guiding the hand crank in its outward and inward movements.

11. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, spring means for moving the hand crank inwardly as the pull decreases, and means for guiding the hand crank in its outward and inward movements.

12. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, spring means for moving the hand crank inwardly as the pull decreases, and means rotatably mounted on the spool shaft for guiding the hand crank in its outward and inward movements.

13. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank having a rack meshing with the pinion to move the hand crank radially outwardly as the pull thereon increases, spring means for moving the hand crank inwardly as the pull decreases, and means rotatably mounted on the spool shaft for guiding the hand crank in its outward and inward movements.

14. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements.

15. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements.

16. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means being interposed between said plate and housing.

17. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means being interposed between said plate and housing.

18. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means comprising a pin projecting from the plate and slidable in the housing and a coil spring surrounding the pin and interposed between the plate and housing.

19. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means comprising a pin projecting from the plate and slidable in the housing and a coil spring surrounding the pin and interposed between the plate and housing.

20. In a fish line reel, a casing, a cross shaft rotatably mounted therein, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means comprising a pair of pins projecting from the plate and slidable in the housing and coil springs surrounding the pins and interposed between the plate and housing.

21. In a fish line reel, a casing, a cross shaft rotatably mounted therein, means for locking the cross shaft to the casing against reverse rotation, a spool rotatably mounted on the cross shaft, a manually operated friction clutch carried by the cross shaft for frictionally engaging the spool, a pinion on the cross shaft, a hand crank comprising a housing having a rack meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements, said spring means comprising a pair of pins projecting from the plate and slidable in the housing and coil springs surrounding the pins and interposed between the plate and housing.

22. In a fish line reel, a casing, a cross shaft rotatably mounted therein, a spool rotatably mounted on the cross shaft, a manually operated friction clutch on the cross shaft for frictionally engaging the spool, a pinion on the cross shaft, a hand crank comprising a housing enclosing the pinion and a rack in the housing meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements.

23. In a fish line reel, a casing, a cross shaft rotatably mounted therein, means for locking the cross shaft to the casing against reverse rotation, a spool rotatably mounted on the cross shaft, a manually operated friction clutch on the cross shaft for frictionally engaging the spool, a pinion on the cross shaft, a hand crank comprising a housing enclosing the pinion and a rack in the housing meshing with the said pinion to move the hand crank outwardly as the pull thereon increases, spring means for moving the hand crank inwardly as the pull decreases, and a plate rotatably mounted on the cross shaft for slidably guiding the housing in its outward and inward movements.

FREDERICK C. GRISWOLD.